United States Patent
Rothman et al.

(10) Patent No.: US 7,555,641 B2
(45) Date of Patent: Jun. 30, 2009

(54) EFFICIENT RESOURCE MAPPING BEYOND INSTALLED MEMORY SPACE BY ANALYSIS OF BOOT TARGET

(75) Inventors: Michael A. Rothman, Sammamish, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 372 days.

(21) Appl. No.: 11/385,285

(22) Filed: Mar. 20, 2006

(65) Prior Publication Data

US 2007/0220241 A1    Sep. 20, 2007

(51) Int. Cl.
*G06F 15/177*    (2006.01)

(52) U.S. Cl. .......................................... 713/1; 711/202

(58) Field of Classification Search ....................... 713/1
See application file for complete search history.

(56) References Cited

U.S. PATENT DOCUMENTS

| | | | | |
|---|---|---|---|---|
| 5,301,328 A | * | 4/1994 | Begur et al. | 711/201 |
| 5,537,596 A | * | 7/1996 | Yu et al. | 717/168 |
| 6,185,654 B1 | * | 2/2001 | Van Doren | 711/5 |
| 6,941,440 B2 | * | 9/2005 | Moll et al. | 711/202 |
| 6,968,398 B2 | * | 11/2005 | Davis et al. | 710/3 |
| 7,009,618 B1 | * | 3/2006 | Brunner et al. | 345/566 |
| 7,206,915 B2 | * | 4/2007 | DeSouter et al. | 711/203 |
| 2007/0156973 A1 | * | 7/2007 | Fleischer et al. | 711/147 |

* cited by examiner

*Primary Examiner*—Chun Cao
(74) *Attorney, Agent, or Firm*—Blakely, Sokoloff, Taylor & Zafman LLP

(57) ABSTRACT

An embodiment of the present invention is a technique to provide resource mapping. A boot target of a platform is analyzed to determine if the boot target supports address mapping of a platform resource above a legacy limit. A new resource mapping beyond an address range of a memory installed on the platform is constructed if the address mapping above the legacy limit is supported. The new resource mapping is within a processor address space of a processor. An access is directed to the platform resource using the new resource mapping.

40 Claims, 6 Drawing Sheets

EFFICIENT RESOURCE MAPPING BEYOND INSTALLED MEMORY SPACE BY ANALYSIS OF BOOT TARGET

BACKGROUND

1. Field of the Invention

Embodiments of the invention relate to the field of microprocessor systems, and more specifically, to resource mapping.

2. Description of Related Art

Resource mapping involves allocating address spaces for resources used in a microprocessor platform. Typical resources include firmware and hardware devices that occupy address space on the processor addressing range.

Existing techniques for resource mapping typically result in undesirable consequences. Memory ranges reserved for auxiliary devices such as on-board or add-in devices may not correspond to actual data. The actual address ranges are usually much less than the allocated ranges, leading to unused address space. When mapping the resource reservation above the physical memory in the system, the underlying chipset or target operating system may not be able to handle the mapping of resources above the 4 GB limit of physical memory. As more and more platforms are populated with physical memory approaching the 4 GB address space, competition of address space between the physical memory and other resources may lead to "stealing" of memory from the platform.

BRIEF DESCRIPTION OF THE DRAWINGS

Embodiments of invention may best be understood by referring to the following description and accompanying drawings that are used to illustrate embodiments of the invention. In the drawings.

DESCRIPTION

An embodiment of the present invention is a technique to provide resource mapping. A boot target of a platform is analyzed to determine if the boot target supports address mapping of a platform resource above a legacy limit. A new resource mapping beyond an address range of a memory installed on the platform is constructed if the address mapping above the legacy limit is supported. The new resource mapping is within a processor address space of a processor. An access is directed to the platform resource using the new resource mapping.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention is a technique to provide resource mapping beyond a legacy limit. The technique removes the resource address space to beyond the legacy limit so that the physical memory may populate the entire address space limited by the legacy limit. The technique optimizes platform resources by reclaiming the physical memory space from the unused portion of the resource space. The technique performs the resource mapping dynamically by examining the boot target upon power up to determine if the installed operating system (OS) supports the resource mapping beyond the legacy limit. If such as mapping is supported, a new resource mapping is constructed that moves the resource mapping to a new location beyond the legacy limit. Accordingly, any access to the resource is directed or routed to the new location.

Figure 1:
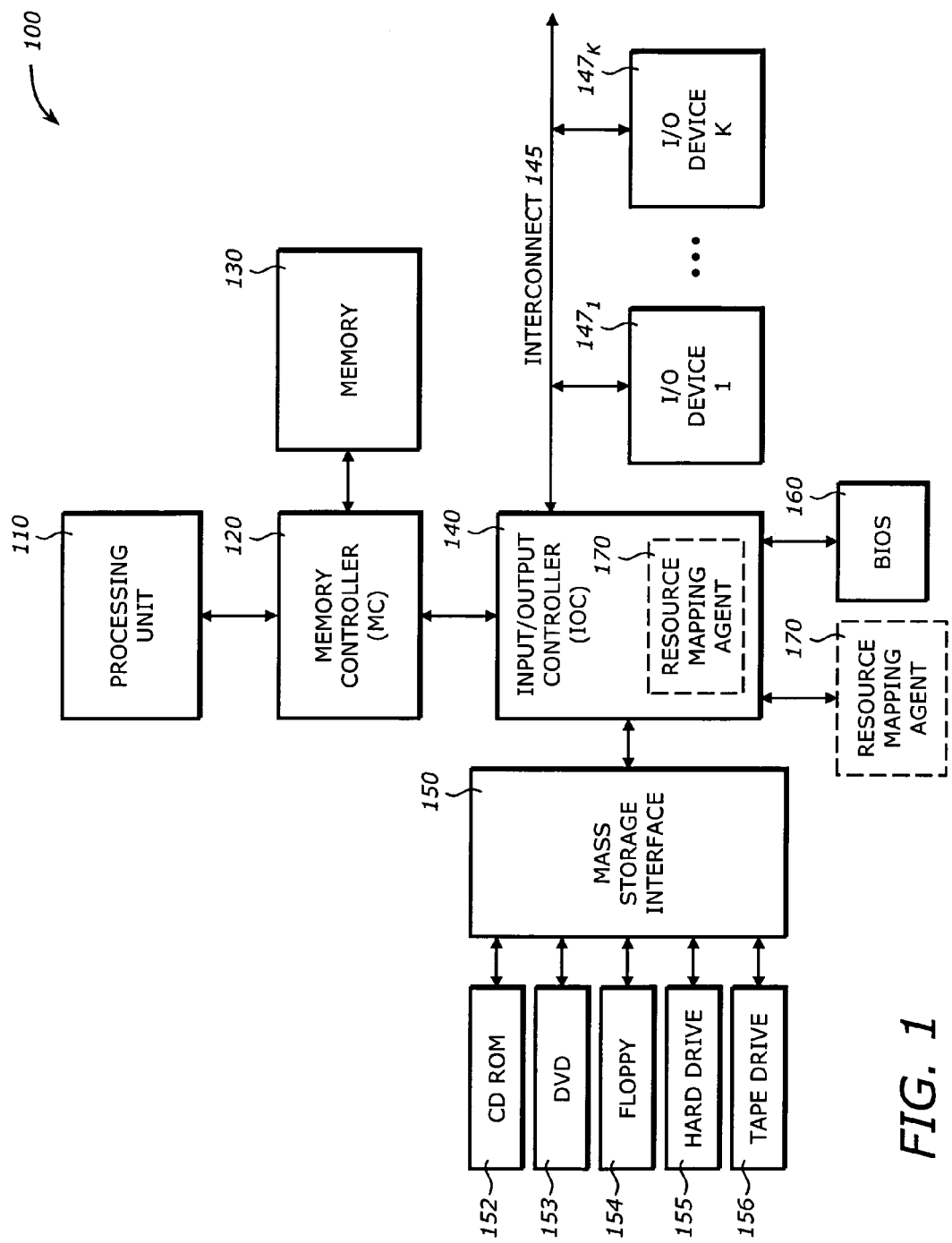
FIG. 1 is a diagram illustrating a system in which one embodiment of the invention can be practiced.

FIG. 1 is a diagram illustrating the system 100 in which one embodiment of the invention can be practiced. The system 100 may be a platform, a unit, a fully or partly configured system. It includes a processor unit 110, a memory controller (MC) 120, a main memory 130, an input/output controller (IOC) 140, an interconnect 145, a mass storage interface 150, and input/output (I/O) devices $147_1$ to $147_K$.

The processor unit 110 represents a central processing unit of any type of architecture, such as processors using hyper threading, security, network, digital media technologies, single-core processors, multi-core processors, embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The processor unit 110 may be a 32-bit or 64-bit microprocessors. It may have a processor address space defining the range in which it can access instructions, data, and other memory mapped devices. The processor address space may be quite large or may correspond to 32-bit address space of a legacy limit. In one embodiment, the legacy limit is 4 Gigabyte (GB).

The MC 120 provides control and configuration of memory and input/output devices such as the main memory 130 and the IOC 140. The MC 120 may be integrated into a chipset that integrates multiple functionalities such as graphics, media, isolated execution mode, host-to-peripheral bus interface, memory control, power management, etc. The MC 120 or the memory controller functionality in the MC 120 may be integrated in the processor unit 110. In some embodiments, the memory controller, either internal or external to the processor unit 110, may work for all cores or processors in the processor unit 110. In other embodiments, it may include different portions that may work separately for different cores or processors in the processor unit 110.

The memory 130 stores system code and data. The main memory 130 is typically implemented with dynamic random access memory (DRAM), static random access memory (SRAM), or any other types of memories including those that do not need to be refreshed. The memory 130 may include multiple channels of memory devices such as DRAMs. The DRAMs may be Synchronous DRAM (SDRAM), Single Data Rate (SDR) SDRAM, Extended Data Out (EDO) DRAM, Double Data Rate (DDR) SDRAM, Double Data Rate Two (DDR2) SDRAM, Rambus DRAM (RDRAM R), Extreme Data Rate (XDR), or XDR II. RDRAM and XDR are registered trademarks of Rambus. The DDR doubles transfer rates by transferring data on both the rising and falling edges of the clock and may be packaged in a Dual In Line Memory Module (DIMM). This effectively doubles the transfer rate without increasing the frequency of the front side bus (FSB). The DDR2 increases the data rates using various techniques such as on-die termination to eliminate excess signal noise on the chip, pre-fetch buffers, and off-chip drivers. The off-chip drivers may use calibration techniques to calibrate the differential data strobes against each other. Through the calibration, the ramping voltages are optimized for the buffer impedances to reduce over- and under-shooting at the rising and falling edges. The XDR or XDR II uses Differential Rambus Signaling Levels (DRSL) for scalable high speed point-to-point bidirectional data signals and Rambus Signaling Level (RSL) for source synchronous bussed address and command signals to multiple deices. The memory devices used in the memory 130 may operate at any suitable clock frequency, such as 100 MHz, 133 MHz, 166 MHz, 266 MHz, 333 MHz, 400 Mhz, 1 GHz, or scalable to 8 GHz. They may be packaged in any packaging technologies including Ball Grid Array (BGA), DIMM, sticks or modules. The memory 130 may include memory devices that are populated on the platform and have an address range within the processor address space. Typically, the memory 130 includes physical memory devices that are mapped to within the legacy limit.

The IOC 140 has a number of functionalities that are designed to support I/O functions. The IOC 140 may also be integrated into a chipset together or separate from the MC 120 to perform I/O functions. The IOC 140 may include a number of interface and I/O functions such as peripheral component interconnect (PCI) bus interface, processor interface, interrupt controller, direct memory access (DMA) controller, power management logic, timer, system management bus (SMBus), universal serial bus (USB) interface, mass storage interface, low pin count (LPC) interface, wireless interconnect, direct media interface (DMI), etc. In particular, the IOC 140 includes a resource mapping agent (RMA) 170 to perform resource mapping. The RMA 170 may be fully or partly located inside and/or outside the IOC 140. It may be implemented as a firmware module which contains code to be executed by a processor inside the IOC 140 or even by the processing unit 110. It may also be implemented as a hardware circuit with logic circuits to perform the dynamic address mapping. It may also be implemented as a combination of hardware, firmware, and software. Therefore, the RMA 170 is shown in dotted lines located both inside and outside of the IOC 140. The IOC 140 is also interfaced to a Basic Input/Output System (BIOS) 160. The BIOS 160 may contain code for boot-up, start-up, initializing the resource devices such as the interrupt controller, the disk controller, the mass storage interface 150, and I/O devices $147_1$ to $147_K$, testing, etc. It is typically implemented in a firmware device such as a flash memory.

The interconnect 145 provides interface to peripheral devices. The interconnect 145 may be point-to-point or connected to multiple devices. For clarity, not all interconnects are shown. It is contemplated that the interconnect 145 may include any interconnect or bus such as Peripheral Component Interconnect (PCI), PCI Express, Universal Serial Bus (USB), Small Computer System Interface (SCSI), serial SCSI, and Direct Media Interface (DMI), etc.

The mass storage interface 150 interfaces to mass storage devices to store archive information such as code, programs, files, data, and applications. The mass storage interface may include SCSI, serial SCSI, Advanced Technology Attachment (ATA) (parallel and/or serial), Integrated Drive Electronics (IDE), enhanced IDE, ATA Packet Interface (ATAPI), etc. The mass storage device may include compact disk (CD) read-only memory (ROM) 152, digital video/versatile disc (DVD) 153, floppy drive 154, and hard drive 155, tape drive 156, and any other magnetic or optic storage devices. The mass storage device provides a mechanism to read machine-accessible media. The mass storage device contain a boot target including the partition table, a master boot record, OS loader, or any other relevant information regarding the characteristics or type of the OS to be loaded into the platform.

The I/O devices $147_1$ to $147_K$ may include any I/O devices to perform I/O functions. Examples of I/O devices $147_1$ to $147_K$ include controller for input devices (e.g., keyboard, mouse, trackball, pointing device), media card (e.g., audio, video, graphic), network card, and any other peripheral controllers. The I/O devices $147_1$ to $147_K$ may form the platform resources that are mapped onto the processor address space of the processing unit 110.

Figure 2:
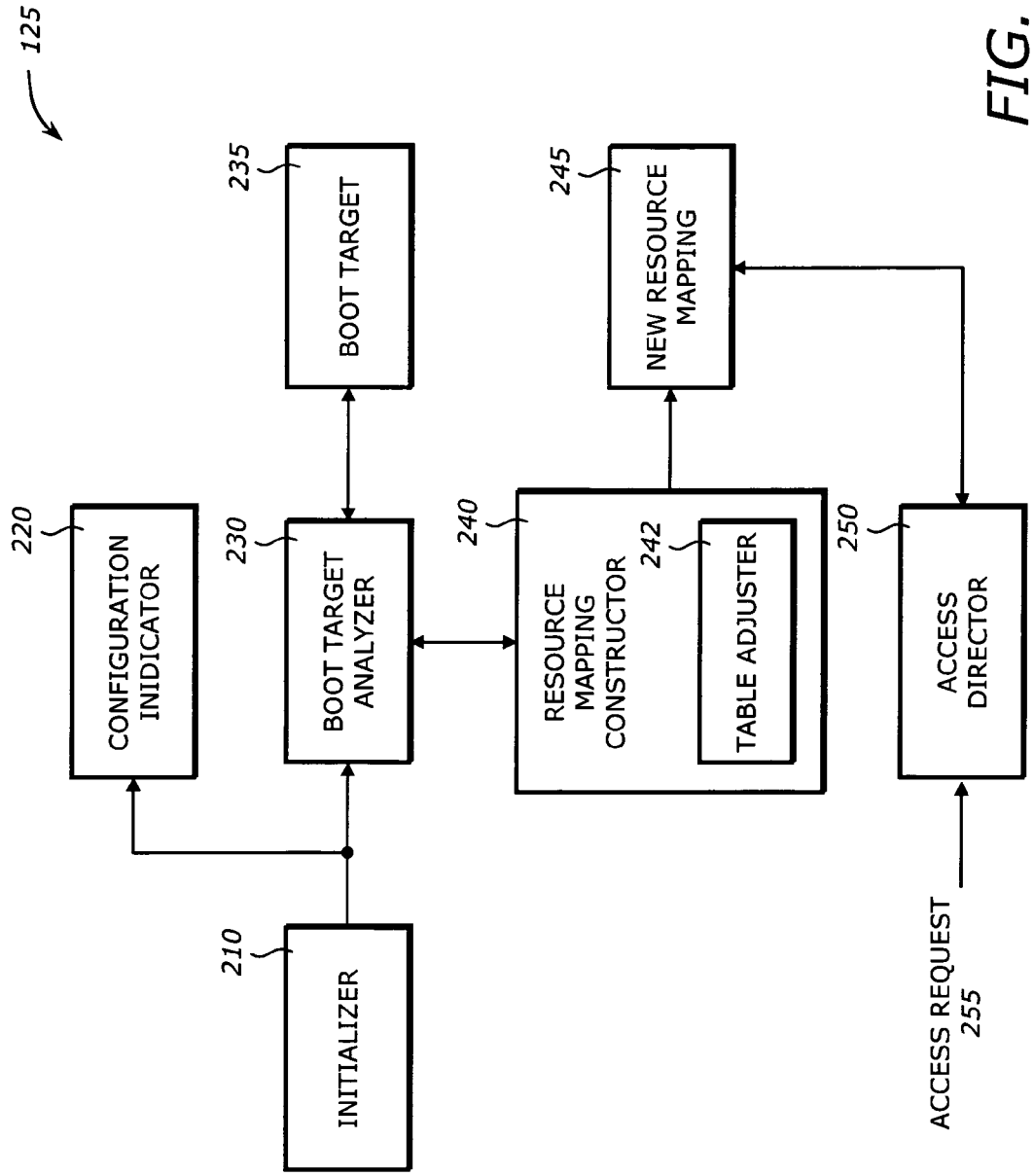
FIG. 2 is a diagram illustrating a resource mapping agent according to one embodiment of the invention.

FIG. 2 is a diagram illustrating a resource mapping agent (RMA) 125 shown in FIG. 1 according to one embodiment of the invention. The RMA 125 includes an initializer 210, a configuration indicator 220, a boot target analyzer 230, a resource mapping constructor 240, and an access director 250.

The initializer 210 initializes infrastructure of the platform. The infrastructure may include resources such as I/O devices, firmware, and memory devices that are mapped to the processor address space of the processor unit 110 (FIG. 1). The initialization may include operations such as initializing I/O devices, testing I/O devices and/or memories, checking presence or absence of peripheral devices or input entry devices, etc.

The configuration indicator 220 indicates if the platform is configured to perform dynamic resource mapping. It may be a configuration register or bit in a non-volatile memory (e.g., flash memory) that is programmed or set at manufacturing or during configuration of the platform. The configuration indicator 220 may be examined by the initializer 210 to determine if the platform supports dynamic resource mapping.

The boot target analyzer 230 analyzes a boot target 235 of the platform to determine if the boot target supports address mapping of a platform resource above the legacy limit. The boot target 235 may represent a mass storage device that contains an operating system (OS) or an OS loader that loads the OS. The mass storage device may be an SCSI or an IDE hard drive from which the platform may boot. In general, the boot target analyzer 230 may include a comparator to compare the boot target 235 against a table of known boot targets. By doing so, the boot target analyzer 230 may determine the type of OS to be loaded and whether or not the loaded OS supports the address mapping of platform resources beyond the legacy limit.

The resource mapping constructor 240 constructs a new resource mapping 245 beyond an address range of the memory 130 installed on the platform if the boot target supports mapping of the platform resource above the legacy limit. The new resource mapping is within a processor address space of a processor. The resource mapping constructor 240 includes a table adjustor 242 to adjust a memory hand-off table describing a memory map.

The access director 250 directs an access request 255 to the platform resource using the new resource mapping 245. The access request 255 may be initiated by the processor unit 110 and detected by other interfacing circuitry in the IOC 140. The access request 255 may be a read operation, a write operation, or any other access operations that may access the platform resource. The access request 255 may include access information such as the address of the target and the type of the access. The access director 250 may include logic circuit to steer or direct the access request to the new resource mapping 245. The access to the platform resource is therefore performed automatically and transparently to the application program.

Figure 3:
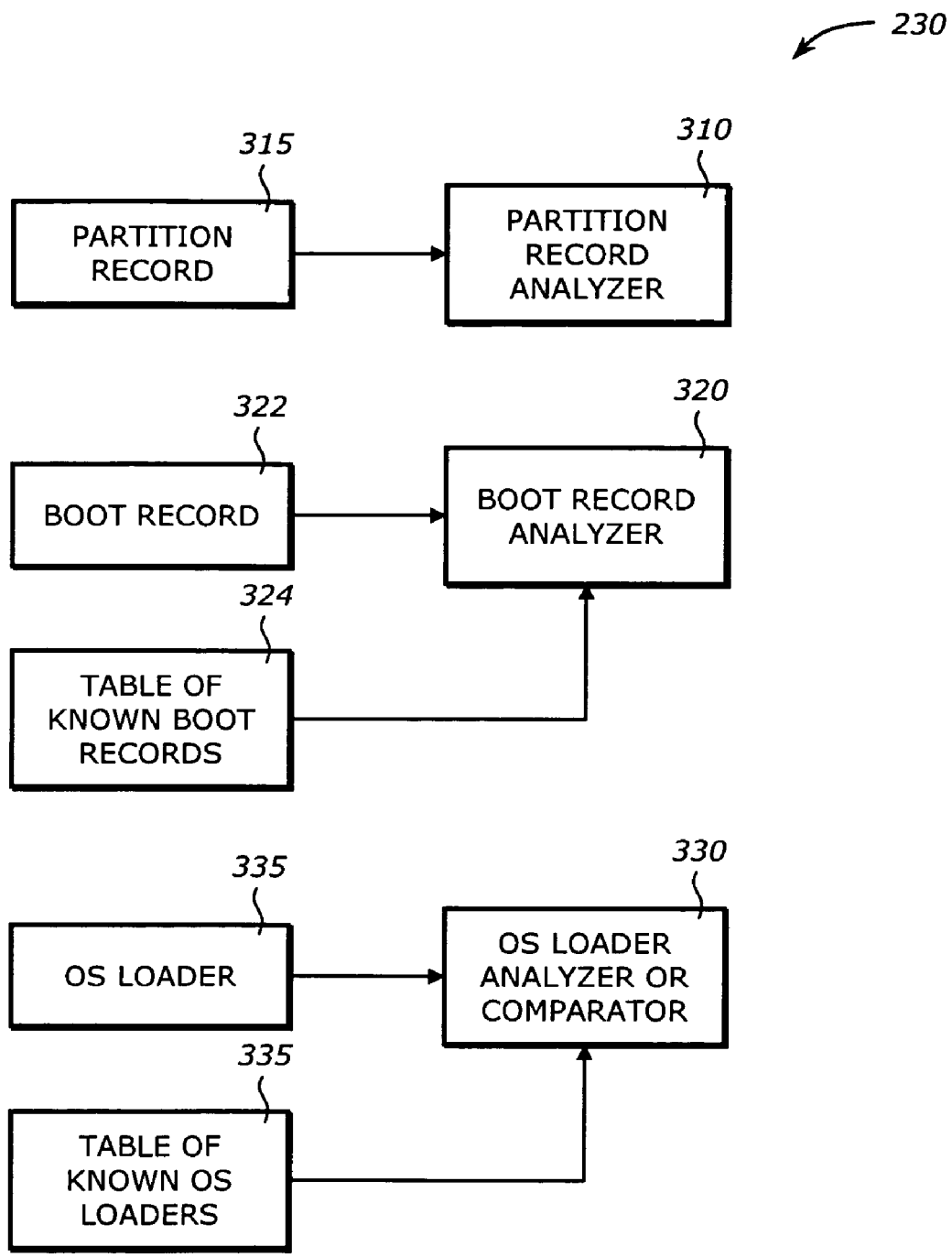
FIG. 3 is a diagram illustrating a boot target analyzer according to one embodiment of the invention.

FIG. 3 is a diagram illustrating the boot target analyzer 230 shown in FIG. 2 according to one embodiment of the invention. The boot target analyzer 230 includes at least one of a partition record analyzer 310, a boot record analyzer 320, and an OS loader analyzer 330. The boot target analyzer 230 may include one or more of the above elements.

The partition record analyzer 310 analyzes a partition record 315 for an operating system indicator. The partition record 315 is a record that shows the partitioning of a mass storage device. For example, the partition record may reveal the partition type such as Disk Operating System (DOS) File Allocation Table (FAT)-16, extended. Linux swap, or Linux Ext2FS. The partition record may also contain information on starting cylinder and head, ending cylinder and head, number of sectors, and which partition is an active boot. The Cylinder Head and Sector (CHS) fields are used by the master boot code to find and load the boot sector of the active partition. The partition record may also include the partition type which provides the system identifier (ID) values in the system ID field. Some OS (e.g., Windows XP Professional) uses the System ID field to determine which file system device drivers to load during boot-up. By reading and decoding these parameters or information, the partition record analyzer 310 may know the exact type of OS to be loaded and whether or not it supports mapping beyond the legacy limit.

The boot record analyzer 320 reads a boot record 322 from a target data sector and compares the boot record 322 against a table of known boot records. The boot record 322 may be a master boot record that is a sector on the logical beginning of a mass storage device that contains the sequence of commands necessary to boot the OS. The boot record 322 may include a boot code to perform a number of operations such as scanning the partition table, finding the starting sector of the active partition, loading a copy of the boot sector, and transferring control to the executable code in the boot sector. By comparing the boot record 322 against known boot records, the boot record analyzer 320 may determine if the OS supports the address mapping above the legacy limit.

The operating system loader analyzer 330 analyzes an operating system loader 335 to determining an encoding type. It may also compare the OS loader 335 with a table of known OS loaders 335. Examples of known OS loaders may include Live CD, Grand Unified Bootloader (GRUB), Linux Loader (LILO), NT Loader (NTLDR), eXtended Operating System Loader (XOSL), Linux loader (loadlin), etc. The OS loader 335 is a small code or program that may be executed by the processor unit 110 to load the OS. The OS loader 335 may reside on a mass storage device such as the hard drive, a portable CD ROM, or a USB flash drive. An OS loader 335 when executed may allow the user to select which OS to be loaded. The encoding type may be track/head/sector encoding or linear block number encoding. By comparing the OS loader 335 with known OS loaders, the OS loader analyzer 330 may determine the exact OS to be loaded into the platform and whether or not this OS supports the address mapping beyond the legacy limit.

Figure 4:
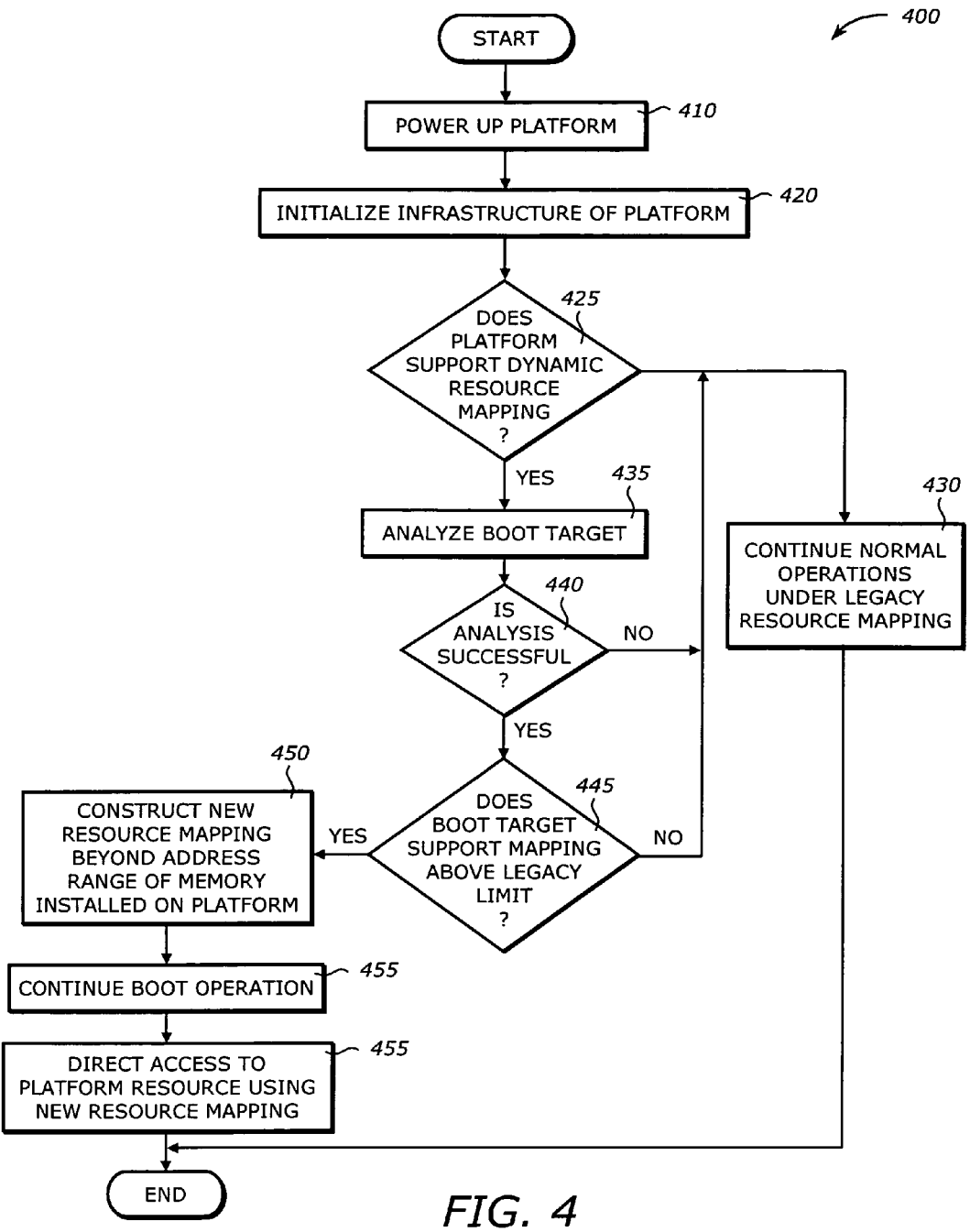
FIG. 4 is a flowchart illustrating a process to perform resource mapping according to one embodiment of the invention.

FIG. 4 is a flowchart illustrating a process 400 to perform resource mapping according to one embodiment of the invention.

Upon START, the process 400 powers up the platform (Block 410). This may include the power on self test sequence. Then, the process 400 initializes the infrastructure of the platform (Block 415). Next, the process 400 determines if the platform performs dynamic resource mapping (Block 425). This may be performed by examining a configuration indicator in a non-volatile memory.

Then, the process 400 analyzes a boot target of a platform to determine if the boot target supports address mapping of a platform resource above a legacy limit (Block 435). If not, the process 400 continues the normal operation under a legacy resource mapping (Block 430) and is then terminated. Otherwise, the process 400 determines if the analysis of the boot target is successful (Block 440). Many factors may affect the analysis. For example, the comparison of the boot target with a table of known targets may be inconclusive, such as there are no matches.

If the analysis is not successful, the process 400 goes to Block 430 to continue normal operation under a legacy resource mapping and is then terminated. Otherwise, the process 400 determines if the boot target supports the address mapping of the platform resource above the legacy limit (Block 445). If not, the process 400 goes to Block 430 to continue normal operation under a legacy resource mapping and is then terminated. Otherwise, the process 400 constructs a new resource mapping beyond an address range of a memory installed on the platform (Block 450). The new resource mapping is within a processor address space of the processor on the platform. As part of the construction of the new resource mapping, the process 400 may adjust a memory hand-off table describing a memory map that may be used by the addressing mapping of the chipset controller. Then, the process 400 continues the boot operation (Block 455). This may include loading the appropriate OS, executing the OS sequence, etc. Then, the process 400 directs an access to a platform resource using the new resource mapping (Block 460). The process 400 is then terminated.

Figure 5:
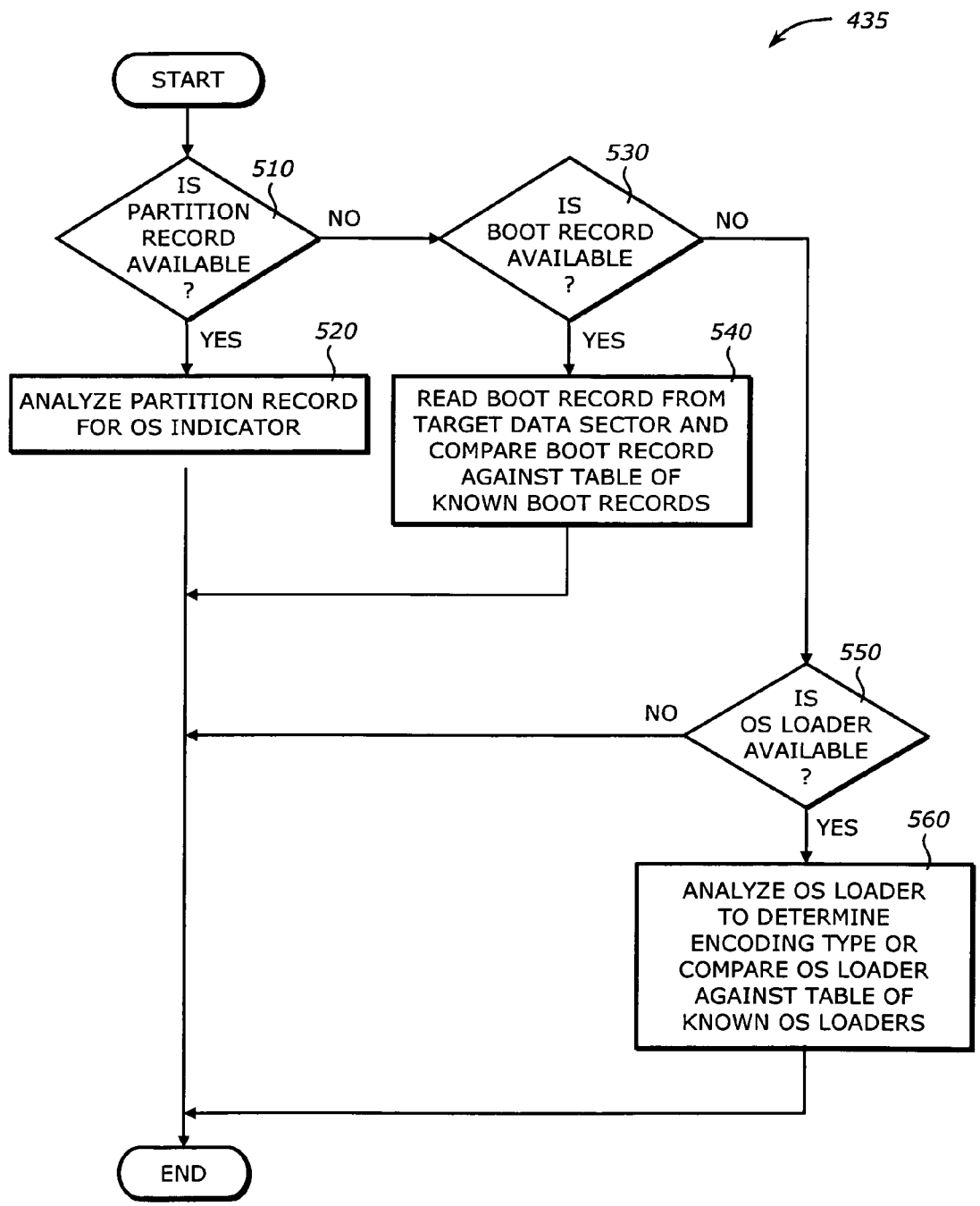
FIG. 5 is a flowchart illustrating a process to analyze a boot target according to one embodiment of the invention.

FIG. 5 is a flowchart illustrating the process 435 shown in FIG. 4 to analyze a boot target according to one embodiment of the invention. It is noted that the order of the sequence shown in FIG. 5 may be any order.

Upon START, the process 435 determines if a partition record is available (Block 510). If so, the process 435 analyzes the partition record for an OS indicator (Block 520) and is then terminated. Otherwise, the process 435 determines if a boot record is available (Block 530). If so, the process 435 reads a boot record from a target data sector and compares the boot record against a table of known boot records (Block 540) and is then terminated. Otherwise, the process 435 determines if an OS loader is available (Block 550). If so, the process 435 analyzes the OS loader to determine the encoding type or compares the OS loader against a table to known OS loaders and is then terminated (Block 560). Otherwise, the process 435 is terminated.

Figure 6:
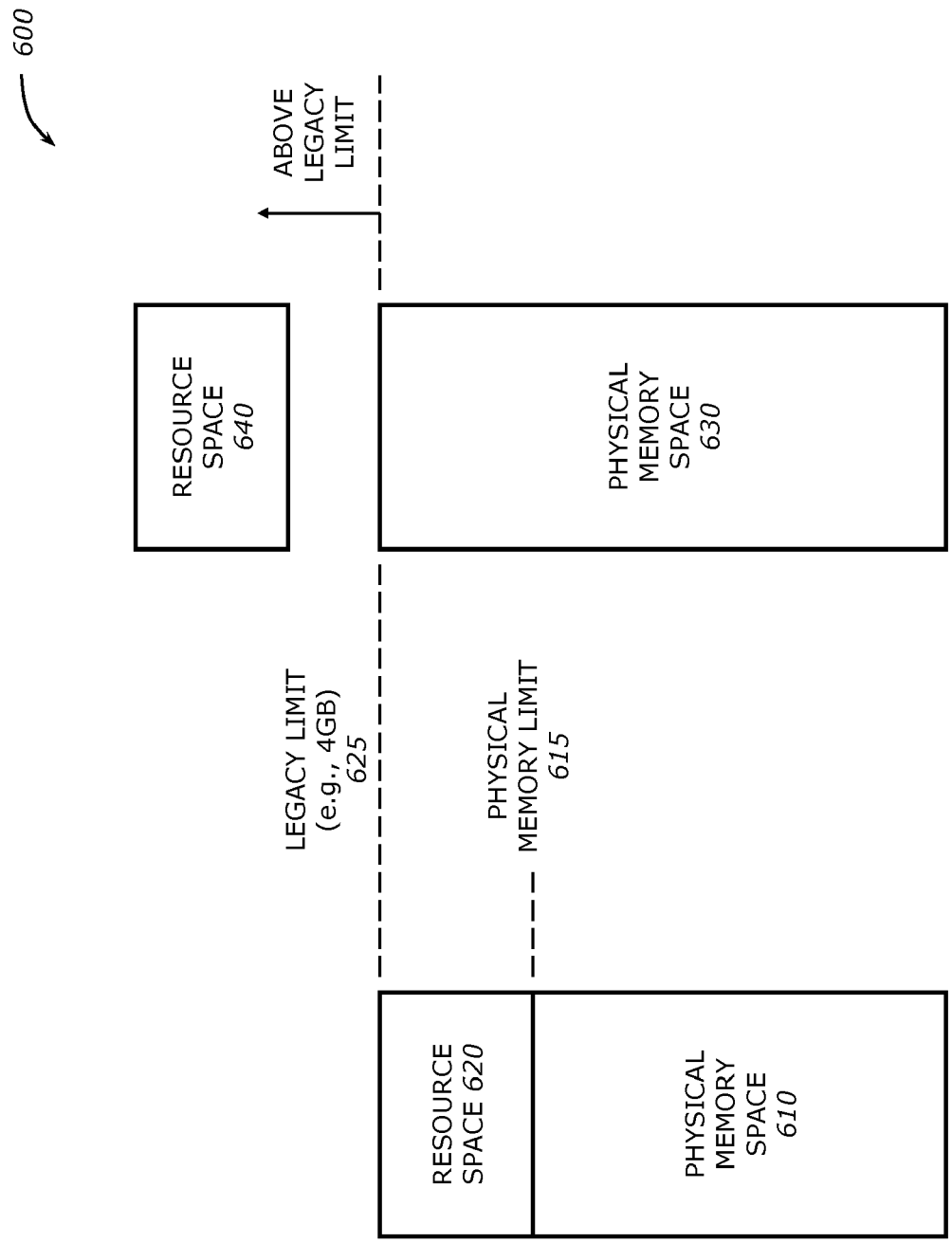
FIG. 6 is a diagram illustrating result of resource mapping according to one embodiment of the invention.

FIG. 6 is a diagram illustrating a result 600 of resource mapping according to one embodiment of the invention. Before the resource mapping, the installed memory on the platform occupies a physical memory space 610 and the platform resources occupy a resource space 620. The physical memory space 610 is limited by the physical memory limit 615. Both the resource space 620 and the physical memory space are below the legacy limit 625. The legacy limit 625 may be 4 GB. The resource space 620 may occupy a large space, such as half a GB although there are only a few devices having very small address space (e.g., less than 4 KB). The result is that there is a significantly large address space that is unused. Accordingly, the address space for the physical memory is lost or "stolen" due to this unused space.

After the new resource mapping is deployed, the resource space 620 is moved out of the legacy limit 625 to become a resource space 640 which is located beyond the legacy limit

625. This removal of the resource space 620 frees the space for the physical memory to fully occupy the entire address space up to the legacy limit 625. The physical memory space 610 now becomes a physical memory space 630. The physical memory limit 615 now becomes the same as the legacy limit 625. Therefore, the memory devices populated on the platform may now have the entire 4 GB address space.

Elements of embodiments of the invention may be implemented by hardware, firmware, software or any combination thereof. The term hardware generally refers to an element having a physical structure such as electronic, electromagnetic, optical, electro-optical, mechanical, electromechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   analyzing a boot target of a platform to determine if the boot target supports address mapping of a platform resource above a legacy limit;
   constructing a new resource mapping beyond an address range of a memory installed on the platform if the address mapping above the legacy limit is supported, the new resource mapping being within a processor address space of a processor; and
   directing an access to the platform resource using the new resource mapping.

2. The method of claim 1 wherein analyzing the boot target comprises one of:
   analyzing a partition record for an operating system (OS) indicator;
   reading a boot record from a target data sector and comparing the boot record against a table of known boot records;
   analyzing an OS loader to determining an encoding type; and
   comparing the OS loader against a table of known OS loaders.

3. The method of claim 1 wherein analyzing the boot target comprises:
   comparing the boot target against a table of known boot targets.

4. The method of claim 1 wherein constructing the new resource mapping comprises:
   adjusting a memory hand-off table describing a memory map.

5. The method of claim 1 further comprising:
  initializing infrastructure of the platform; and
  determining if the platform performs dynamic resource mapping.

6. The method of claim 5 further comprising:
  continuing normal operation under a legacy resource mapping if the platform does not perform dynamic resource mapping or if the boot target is not successfully analyzed.

7. The method of claim 5 wherein determining if the platform performs dynamic resource mapping comprises:
  examining a configuration indicator in a non-volatile memory.

8. The method of claim 1 wherein the legacy limit is 4 Gigabyte (GB).

9. An apparatus comprising:
  a boot target analyzer to analyze a boot target of a platform to determine if the boot target supports address mapping of a platform resource above a legacy limit;
  a resource mapping constructor coupled to the boot target analyzer to construct a new resource mapping beyond an address range of a memory installed on the platform if the address mapping above the legacy limit is supported, the new resource mapping being within a processor address space of a processor; and
  an access director coupled to the resource mapping constructor to direct an access to the platform resource using the new resource mapping.

10. The apparatus of claim 9 wherein the boot target analyzer comprises one of:
  a partition record analyzer to analyze a partition record for an operating system (OS) indicator;
  a boot record analyzer to read a boot record from a target data sector and compare the boot record against a table of known boot records; and
  an OS loader analyzer to analyze an operating system loader to determining an encoding type; and
  a comparator to compare the OS loader against a table of known OS loaders.

11. The apparatus of claim 9 wherein the boot target analyzer comprises:
  a comparator to compare the boot target against a table of known boot targets.

12. The apparatus of claim 9 wherein the resource mapping constructor comprises:
  a table adjustor to adjust a memory hand-off table describing a memory map.

13. The apparatus of claim 9 further comprising:
  an initializer to initialize infrastructure of the platform; and
  a configuration indicator to indicate if the platform is configured to perform dynamic resource mapping.

14. The apparatus of claim 9 wherein the legacy limit is 4 Gigabyte (GB).

15. A system comprising:
  a processor operating on a platform and having a processor address space;
  a memory coupled to the processor having an address range within the processor address space, the memory including a plurality of double data rate synchronous dynamic random access memory devices; and
  a chipset controller coupled to the processor and the memory, the chipset controller having a resource mapping agent, the resource mapping agent comprising:
    a boot target analyzer to analyze a boot target of a platform to determine if the boot target supports address mapping of a platform resource above a legacy limit,
    a resource mapping constructor coupled to the boot target analyzer to construct a new resource mapping beyond an address range of a memory installed on the platform if the address mapping of the platform resource above the legacy limit,
    the new resource mapping being within a processor address space of a processor, and
    an access director coupled to the resource mapping constructor to direct an access to the platform resources using the new resource mapping.

16. The system of claim 15 wherein the boot target analyzer comprises one of:
  a partition record analyzer to analyze a partition record for an operating system (OS) indicator;
  a boot record analyzer to read a boot record from a target data sector and compare the boot record against a table of known boot records;
  an OS loader analyzer to analyze an OS loader to determining an encoding type; and
  a comparator to compare the OS loader against a table of known OS loaders.

17. The system of claim 15 wherein the boot target analyzer comprises:
  a comparator to compare the boot target against a table of known boot targets.

18. The system of claim 15 wherein the resource mapping constructor comprises:
  a table adjustor to adjust a memory hand-off table describing a memory map.

19. The system of claim 15 wherein the resource mapping agent further comprises:
  an initializer to initialize infrastructure of the platform; and
  a configuration indicator to indicate if the platform is configured to perform dynamic resource mapping.

20. The system of claim 15 wherein the legacy limit is 4 Gigabyte (GB).

21. An article of manufacture comprising:
  a machine-accessible storage medium including data that, when accessed by a machine, cause the machine to perform operations comprising:
  analyzing a boot target of a platform to determine if the boot target supports address mapping of a platform resource above a legacy limit;
  constructing a new resource mapping beyond an address range of a memory installed on the platform if the address mapping of the platform resource above the legacy limit is supported, the new resource mapping being within a processor address space of a processor; and
  directing an access to the platform resource using the new resource mapping.

22. The article of manufacture of claim 21 wherein the data causing the machine to perform analyzing the boot target comprises data that, when accessed by a machine, cause the machine to perform operations comprising one of:
  analyzing a partition record for an operating system (OS) indicator;
  reading a boot record from a target data sector and comparing the boot record against a table of known boot records; and
  analyzing an OS loader to determining an encoding type; and
  comparing the OS loader against a table of known OS loaders.

23. The article of manufacture of claim 21 wherein the data causing the machine to perform analyzing the boot target comprises data that, when accessed by a machine, cause the machine to perform operations comprising:
    comparing the boot target against a table of known boot targets.

24. The article of manufacture of claim 21 wherein the data causing the machine to perform constructing the new resource mapping comprises data that, when accessed by a machine, cause the machine to perform operations comprising:
    adjusting a memory hand-off table describing a memory map.

25. The article of manufacture of claim 21 wherein the data further comprises data that, when accessed by a machine, cause the machine to perform operations comprising:
    initializing infrastructure of the platform; and
    determining if the platform performs dynamic resource mapping.

26. The article of manufacture of claim 25 wherein the data further comprises data that, when accessed by a machine, cause the machine to perform operations comprising:
    continuing normal operation under a legacy resource mapping if the platform does not perform dynamic resource mapping or if the boot target is not successfully analyzed.

27. The article of manufacture of claim 25 wherein the data causing the machine to perform determining if the platform performs dynamic resource mapping comprises data that, when accessed by a machine, cause the machine to perform operations comprising:
    examining a configuration indicator in a non-volatile memory.

28. The article of manufacture of claim 21 wherein the legacy limit is 4 Gigabyte (GB).

29. The method of claim 2 wherein the known OS loaders include at least Live CD, Grand Unified Bootloader (GRUB), Linux Loader (LILO), NT Loader (NTLDR), eXtended Operating System Loader (XOSL), Linux loader (loadlin).

30. The method of claim 1 further comprising:
    moving a resource space located below the legacy limit to beyond the legacy limit.

31. The method of claim 30 further comprising:
    freeing space for physical memory to fully occupy entire address space up to the legacy limit.

32. The apparatus of claim 10 wherein the known OS loaders include at least Live CD, Grand Unified Bootloader (GRUB), Linux Loader (LILO), NT Loader (NTLDR), eXtended Operating System Loader (XOSL), Linux loader (loadlin).

33. The apparatus of claim 9 wherein a resource space located below the legacy limit is moved to beyond the legacy limit.

34. The apparatus of claim 33 wherein space is freed for physical memory to fully occupy entire address space up to the legacy limit.

35. The system of claim 16 wherein the known OS loaders include at least Live CD, Grand Unified Bootloader (GRUB), Linux Loader (LILO), NT Loader (NTLDR), eXtended Operating System Loader (XOSL), Linux loader (loadlin).

36. The system of claim 15 wherein a resource space located below the legacy limit is moved to beyond the legacy limit.

37. The system of claim 36 wherein space is freed for physical memory to fully occupy entire address space up to the legacy limit.

38. The article of manufacture of claim 22 wherein the known OS loaders include at least Live CD, Grand Unified Bootloader (GRUB), Linux Loader (LILO), NT Loader (NTLDR), eXtended Operating System Loader (XOSL), Linux loader (loadlin).

39. The article of manufacture of claim 21 wherein the data further comprises data that, when accessed by a machine, cause the machine to perform operations comprising:
    moving a resource space located below the legacy limit to beyond the legacy limit.

40. The article of manufacture of claim 39 wherein the data further comprises data that, when accessed by a machine, cause the machine to perform operations comprising:
    freeing space for physical memory to fully occupy entire address space up to the legacy limit.

* * * * *